(12) United States Patent
Amor et al.

(10) Patent No.: US 10,365,476 B2
(45) Date of Patent: Jul. 30, 2019

(54) METHOD FOR OPERATING A LASER PROJECTOR TO HAVE A UNIFORM SCAN PATTERN

(71) Applicant: STMicroelectronics Ltd, Netanya (IL)

(72) Inventors: Guy Amor, Gan-Yavne (IL); Offir Duvdevany, Tel-Aviv (IL)

(73) Assignee: STMicroelectronics Ltd, Netanya (IL)

( * ) Notice: Subject to any disclaimer, the term of this patent is extended or adjusted under 35 U.S.C. 154(b) by 37 days.

(21) Appl. No.: 15/643,164

(22) Filed: Jul. 6, 2017

(65) Prior Publication Data

US 2019/0011695 A1  Jan. 10, 2019

(51) Int. Cl.
*G02B 26/10* (2006.01)
*H04N 9/31* (2006.01)

(52) U.S. Cl.
CPC ......... *G02B 26/101* (2013.01); *H04N 9/3135* (2013.01); *H04N 9/3164* (2013.01); *H04N 9/3161* (2013.01)

(58) Field of Classification Search
CPC .. G02B 26/101; H04N 9/3135; H04N 9/3161; H04N 9/3164
USPC ......... 359/198.1–199.4, 200.6, 200.7, 200.8; 353/121
See application file for complete search history.

(56) References Cited

U.S. PATENT DOCUMENTS

| | | | | |
|---|---|---|---|---|
| 7,130,095 B1* | 10/2006 | Wood | ..................... | G09G 3/002 359/201.1 |
| 2012/0092738 A1* | 4/2012 | Brown | ............... | G02B 26/0833 359/201.1 |
| 2012/0262680 A1* | 10/2012 | Hudman | .............. | H04N 9/3173 353/69 |
| 2013/0342816 A1* | 12/2013 | Furui | ................... | G03B 21/147 353/69 |
| 2016/0255316 A1* | 9/2016 | Kobori | ................ | G02B 26/101 348/746 |
| 2017/0070714 A1* | 3/2017 | Honkanen | ............... | G01S 17/08 |
| 2017/0195647 A1* | 7/2017 | Honkanen | ........... | H04N 9/3185 |

* cited by examiner

*Primary Examiner* — Frank G Font
(74) *Attorney, Agent, or Firm* — Crowe & Dunlevy

(57) ABSTRACT

Mirror control circuitry described herein is for controlling a first micro-mirror of a micro-mirror apparatus that scans across a target area in a scan pattern. The mirror control circuitry includes a processor that determines a mechanical angle of the first micro-mirror for a given instant in time during scanning of the first micro-mirror between upper and lower rotational limits, the mechanical angle being such to maintain the scan pattern as being uniform while the micro-mirror apparatus scans across the target area between the upper and lower rotational limits. The processor also generates a driving signal for the first micro-mirror as a function of the determined mechanical angle for the first micro-mirror at the given instant in time.

27 Claims, 4 Drawing Sheets

METHOD FOR OPERATING A LASER PROJECTOR TO HAVE A UNIFORM SCAN PATTERN

TECHNICAL FIELD

This disclosure relates generally to image scanning, and, more particularly, to scanning methods for use by laser scanning projectors to provide for a scan pattern that remains uniform to provide for a consistent display resolution.

BACKGROUND

Laser scanning projectors constructed from microelectromechanical system (MEMS) components can be relatively small, and therefore implemented into easily portable devices such as picoprojectors. These laser scanning projectors can be used to display fixed or moving video images on a screen, wall, lens (in the case of a smartglass wearable), or user's skin (in the case of a smartwatch wearable). Since modern digital media is often in a high definition format, it is desirable for such laser scanning projectors to be capable of image display in high definition.

In general, MEMS laser scanning projectors function by optically combining red, green, and blue laser beams to form an RGB laser beam, and then directing the RGB laser beam to either a bi-axial mirror, or a set of two uni-axial mirrors working in tandem, with one of the axes being a fast axis and the other axis being a slow axis. The mirror or mirrors are controlled so as to linearly move at a constant rate along a slow axis, or "scan" the laser in a series of vertically spaced apart horizontal lines at a rate of speed such that the human eye perceived a complete image.

However, particularly in the case of laser scanning projectors, as the keystone angle (the angle between the RGB laser and normal to the plane of the target when the mirror or mirrors are at rest) angle increases, when the angle of incidence of the RGB laser beam on the screen changes as the scan proceeds through different vertically spaced apart horizontal lines, the use of a linear scan when the mirror is actuated at a constant angular speed provides for a non-uniform scan pattern and a non-constant movement speed of the beam spot on the target during the scan pattern. This can be seen in FIG. 1, in which the vertical spacing between the horizontal lines toward the top of the pattern is greater than the vertical spacing between horizontal lines toward the bottom of the pattern.

This results in the image formed having a non-constant vertical spatial resolution, which worsens image quality. In addition, this results in uneven image brightness, which further worsens image quality.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A device disclosed herein includes a processor configured to generate values of a mechanical angle for a slow-axis micro-mirror that scans across a target area in a scan pattern and to store the values in a lookup table. The processor generates the values by determining a mechanical angle of the first micro-mirror for a given instant in time during scanning of the first micro-mirror between upper and lower rotational limits, and storing the mechanical angle in the lookup table, the mechanical angle being such to maintain the scan pattern as being uniform while the micro-mirror apparatus scans across the target area between the upper and lower rotational limits. These generated values may be generated in real time during operation by the processor, or by a specific analog implementation of the functions and equations described herein.

The processor may determine the mechanical angle as a function of a distance along a slow axis between a position of a spot of a beam reflected by the micro-mirror apparatus onto the target area when the first micro-mirror is at rest and an upper slow axis limit of the target area, a distance along the slow axis between position of the spot of the beam reflected by the micro-mirror apparatus onto the target area when the first micro-mirror is at rest and a lower slow axis limit of the target area, and an angle between the beam reflected by the micro-mirror apparatus onto the target area when the first micro-mirror is at rest and a vector normal to the target area.

The processor may further determine the mechanical angle as a function of the given instant in time and a total time for the first micro-mirror to sweep from a start angle to an end angle.

The processor may further determine the mechanical angle as a function of a ratio between the given instant in time and a total time for the first micro-mirror to sweep from a start angle to an end angle.

The processor may determine the mechanical angle as:

$$\theta(t) = 0.5 * arctg\left(\frac{\cos(K)}{\frac{1}{\left[yHigh/d + \frac{t}{T} \cdot (yLow/d - yHigh/d)\right]} - \sin(K)}\right)$$

where t is the given instant in time, T is a total time for the first micro-mirror to sweep from a start angle to an end angle, yHigh is a distance along a slow axis between a position of a spot of a beam reflected by the micro-mirror apparatus onto the target area when the first micro-mirror is at rest and an upper slow axis limit of the target area, yLow is a distance along the slow axis between position of the spot of the beam reflected by the micro-mirror apparatus onto the target area when the first micro-mirror is at rest and a lower slow axis limit of the target area, and K is an angle between the beam reflected by the micro-mirror apparatus onto the target area when the first micro-mirror is at rest and a vector normal to the target area.

Also disclosed herein is a device including mirror control circuitry for controlling a first micro-mirror of a micro-mirror apparatus that scans across a target area in a scan pattern. The mirror control circuitry includes a processor configured to determine a mechanical angle of the first micro-mirror for a given instant in time during scanning of the first micro-mirror between upper and lower rotational limits, with the mechanical angle being such to maintain the scan pattern as being uniform while the micro-mirror apparatus scans across the target area between the upper and lower rotational limits.

The processor, or another hardware circuit generates a driving signal for the first micro-mirror as a function of the determined mechanical angle for the first micro-mirror at the given instant in time.

The processor may determine the mechanical angle as a function of a distance along a slow axis between a position of a spot of a beam reflected by the micro-mirror apparatus onto the target area when the first micro-mirror is at rest and an upper slow axis limit of the target area, a distance along the slow axis between position of the spot of the beam reflected by the micro-mirror apparatus onto the target area when the first micro-mirror is at rest and a lower slow axis limit of the target area, and an angle between the beam reflected by the micro-mirror apparatus onto the target area when the first micro-mirror is at rest and a vector normal to the target area.

The processor may further determine the mechanical angle as a function of the given instant in time and a total time for the first micro-mirror to sweep from a start angle to an end angle.

The processor may determine the mechanical angle as a function of a ratio between the given instant in time and a total time for the first micro-mirror to sweep from a start angle to an end angle.

The driving signal for the micro-mirror may be such that angular velocity of the first micro-mirror varies as the first micro-mirror scans between upper and lower rotational limits.

The processor may determine the mechanical angle as:

$$\theta(t) = 0.5 * \arctg\left(\frac{\cos(K)}{\frac{1}{\left[yHigh/d + \frac{t}{T} \cdot (yLow/d - yHigh/d)\right]} - \sin(K)}\right)$$

where t is the given instant in time, T is a total time for the first micro-mirror to sweep from a start angle to an end angle, yHigh is a distance along a slow axis between a position of a spot of a beam reflected by the micro-mirror apparatus onto the target area when the first micro-mirror is at rest and an upper slow axis limit of the target area, yLow is a distance along the slow axis between position of the spot of the beam reflected by the micro-mirror apparatus onto the target area when the first micro-mirror is at rest and a lower slow axis limit of the target area, d is the distance from the target to the first micro-mirror when the first micro mirror is at rest and K is an angle between the beam reflected by the micro-mirror apparatus onto the target area when the first micro-mirror is at rest and a vector normal to the target area.

The two-dimensional micro-mirror apparatus may scan across a target area along a fast axis and along the slow axis. The fast axis may be a horizontal axis and the slow axis may be a vertical axis. The first micro-mirror may be a quasi-statically driven by the driving signal.

The two-dimensional micro-mirror apparatus may also include a second micro-mirror, with the first micro-mirror being a slow axis micro-mirror and the second micro-mirror being a fast axis micro-mirror.

Also disclosed herein is a method of projecting an image onto a target. The method includes generating a beam of collimated light, and scanning the beam of collimated light between first and second opposing display area limits on the target along a fast axis using a fast axis mirror while scanning the beam of collimated light between third and fourth opposing display area limits on the target along a slow axis using a slow axis mirror. The scanning of the beam of collimated light between the third and fourth opposing display area limits on the target along the slow axis may be performed by, at a plurality of instants in time, determining a mechanical angle of the slow axis mirror for a given instant in time of the plurality thereof, the mechanical angle being such to maintain a scan pattern formed by the scanning of the beam of collimated light between the first and second opposing display area limits on the target and the scanning of the beam of collimated light between the third and fourth opposing display area limits on the target as being uniform, and generating a driving signal for the slow axis mirror as a function of the determined mechanical angle for the slow axis mirror at the given instant in time.

DETAILED DESCRIPTION

One or more embodiments of the present disclosure will be described below. These described embodiments are only examples of the presently disclosed techniques. Additionally, in an effort to provide a concise description, all features of an actual implementation may not be described in the specification.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 2A:
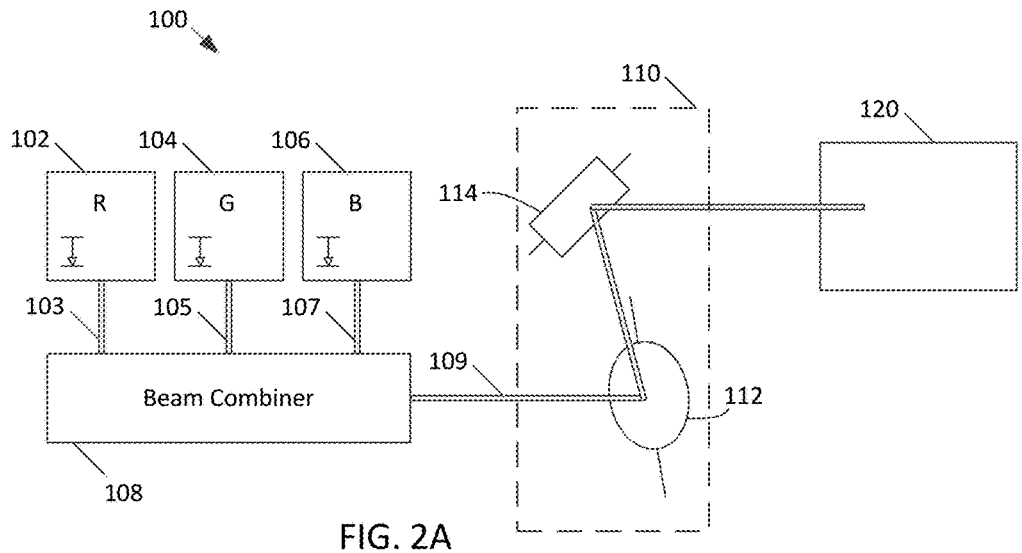
FIG. 2A is a block diagram of a laser scanning projector on which the control techniques and methods described herein may be performed.

Described herein with initial reference to FIG. 2A is a laser scanning projector 100, such as may be used in a self-contained pico-projector or a pico-projector unit incorporated within a portable device such as a smartphone. The laser scanning projector 100 includes a red laser 102, green laser 104, and blue laser 106. These lasers 102, 104, 106 in operation generate beams of collimated light 103, 105, 107 which are combined by a beam combiner 108 into an RGB laser or RGB beam of collimated light 109.

Figure 1:
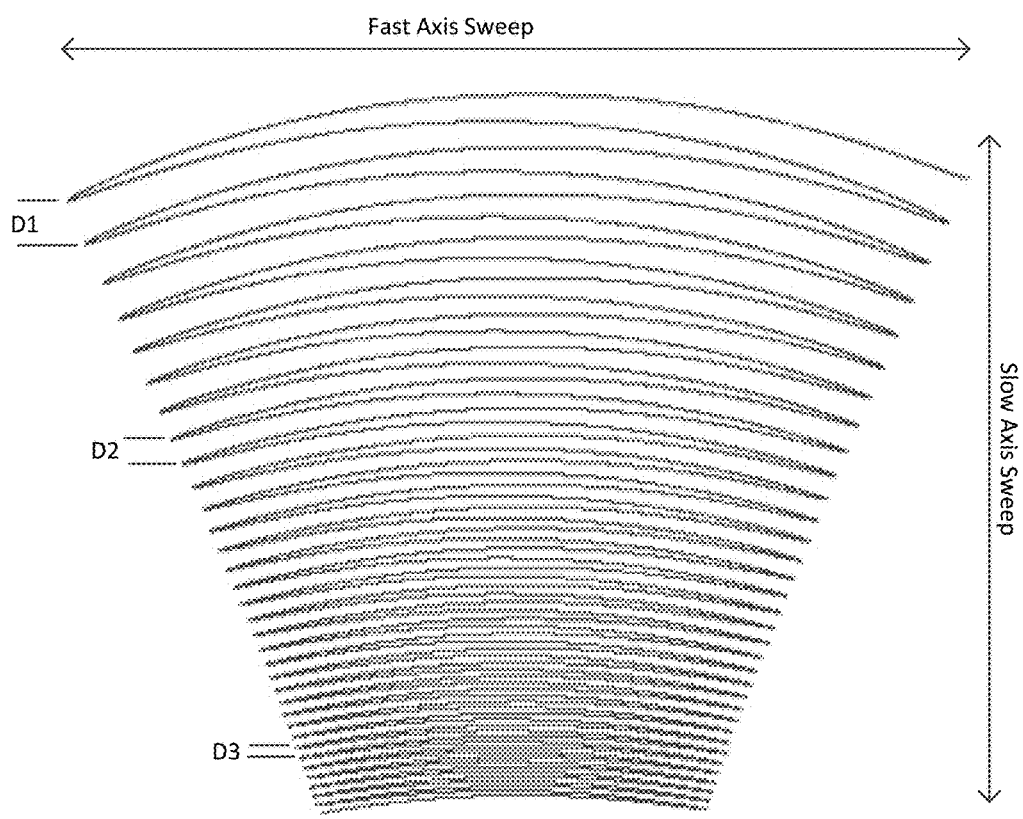
FIG. 1 depicts a non-uniform scan pattern resulting from control of mirrors in a laser scanning projector, with a fast axis mirror (here, horizontal) being controlled in a resonant fashion, and a slow axis (here, vertical) being controlled in a quasi-static linear fashion.

A mirror apparatus 110 receives the RGB laser 109 and reflects it onto a target 120. In greater detail, the mirror apparatus 110 includes a fast axis mirror 112 receiving the RGB laser 109 and reflecting it toward a slow axis mirror 114, which in turn reflects it onto the target 120. The fast axis mirror 112 is controlled to scan the RGB laser 109 between set travel limits for the fast axis, and the slow axis mirror 114 is controlled to scan the RGB laser 109 between set travel limits for the slow axis. The fast axis is typically a horizontal axis while the slow axis is typically the vertical axis, although in some cases the converse may be true. A sample prior art scan pattern produced where a keystone angle is positive is shown in FIG. 1. As can be seen, the fast axis is the horizontal axis, while the slow axis is the vertical axis, and the vertical distance D1 between horizontal lines toward the top of the vertical axis is greater than the distance D2 in the middle, which in turn is greater than the distance D3 toward the bottom.

The fast axis mirror 112 may be a resonating mirror, while the slow axis mirror 114 may be a quasi-static mirror. The slow axis mirror 114 may be displaced using magnetic, electro static, or piezoelectric forces. The fast axis mirror likewise may be displaced using magnetic, electro static, or piezoelectric forces. In some cases, instead of a separate fast axis mirror 112 and a separate slow axis mirror 114, a single biaxial mirror may be used that is driven on both a fast axis and a slow axis.

Figure 2B:
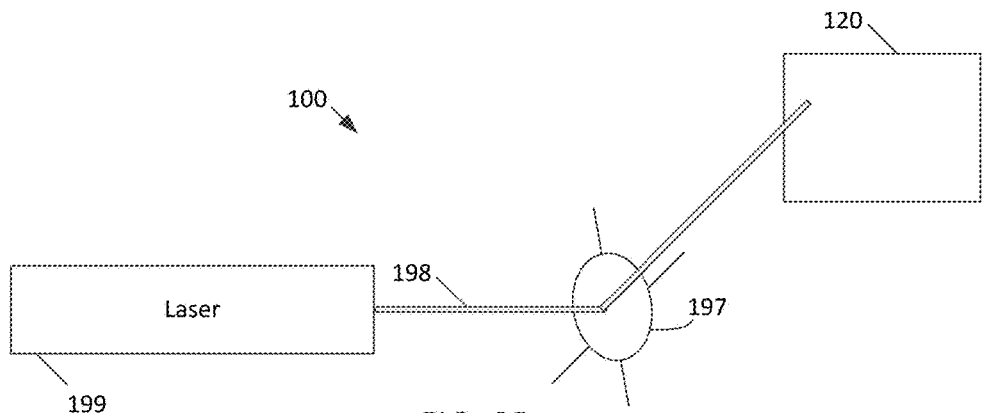
FIG. 2B is a block diagram of another configuration of laser scanning projector on which the control techniques and methods described herein may be performed.

In some instances, such as shown in FIG. 2B the laser scanning device 100 includes a single laser 199, such as an infrared laser, that emits a laser beam 198 toward a mirror 197, which in turn reflects the laser beam 198 onto the target 120. The mirror 197 is biaxial, and thus is driven on both a fast axis and a slow axis. In other cases, the mirror 197 may instead use a mirror apparatus 110 with both a fast axis mirror 112 and slow axis mirror 114, such as shown in FIG. 2A.

Figure 3:
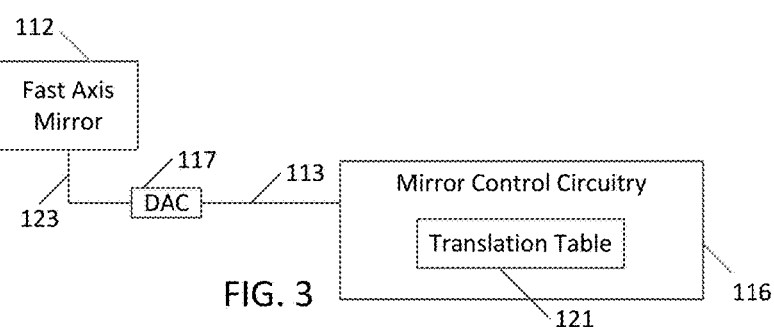
FIG. 3 is a further block diagram of the laser scanning projector of FIG. 2A in which the mirror control circuitry is shown.

As shown in FIG. 3 viewed in conjunction with FIG. 2A, mirror control circuitry 116 generates digital control signals 113 for the slow axis mirror 114. The digital control signals 113 are converted to analog signals 123 by digital to analog converter 117 and then used to drive the slow axis mirror 114 to cause the displacements thereof. In some cases, an amplifier or current driver may be between the digital to analog converter 117 and the mirror control circuitry 116. An amplifier may be used in the case of an electrostatically actuated mirror and is used to increase the voltage, and a current driver may be used in the case of a magnetically actuated mirror.

The Inventors have found that by driving the slow axis mirror 114 so that the mechanical angle $\theta_{mechanical}$ thereof (which will be described in detail below) changes nonlinearly with respect to time in a specific fashion, the speed of the beam spot on the target 120 can be maintained as constant, providing for a uniform scan pattern that has a uniform resolution along the slow axis and a uniform brightness along the slow axis. To do this, the mirror control circuitry 116 continuously, at discrete time intervals, determines a suitable mechanical angle $\theta_{mechanical}$ of the slow axis mirror 114 for that given instant in time during scanning of the slow axis mirror 114 between upper and lower rotational limits or upper and lower mechanical angles. The mirror control circuitry 116 then generates the driving signal 113 based upon the determined mechanical angle $\theta_{mechanical}$.

Calculation of these mechanical angles $\theta_{mechanical}$ is now described in detail. First, an angle K, which can be referred to as a keystone angle of the RGB laser 109, is defined as the angle between the RGB laser 109 and normal to the plane of the target 120. Angle S is the start angle of the RGB laser 109, and is chosen as being negative with respect to the rest position of the slow axis mirror 114. Angle E is the end angle of the RGB laser 109, as is chosen as being positive with respect to the rest position of the slow axis mirror 114. The keystone K is user settable or selectable and thus is received as input by the mirror control circuitry 116. Likewise, angles S and E are user selectable or settable, either directly, or indirectly through a setting of opening angle (which is E-S), and thus are also received as input by the mirror control circuitry. S and E may each be half the opening angle, for example.

Figure 4:
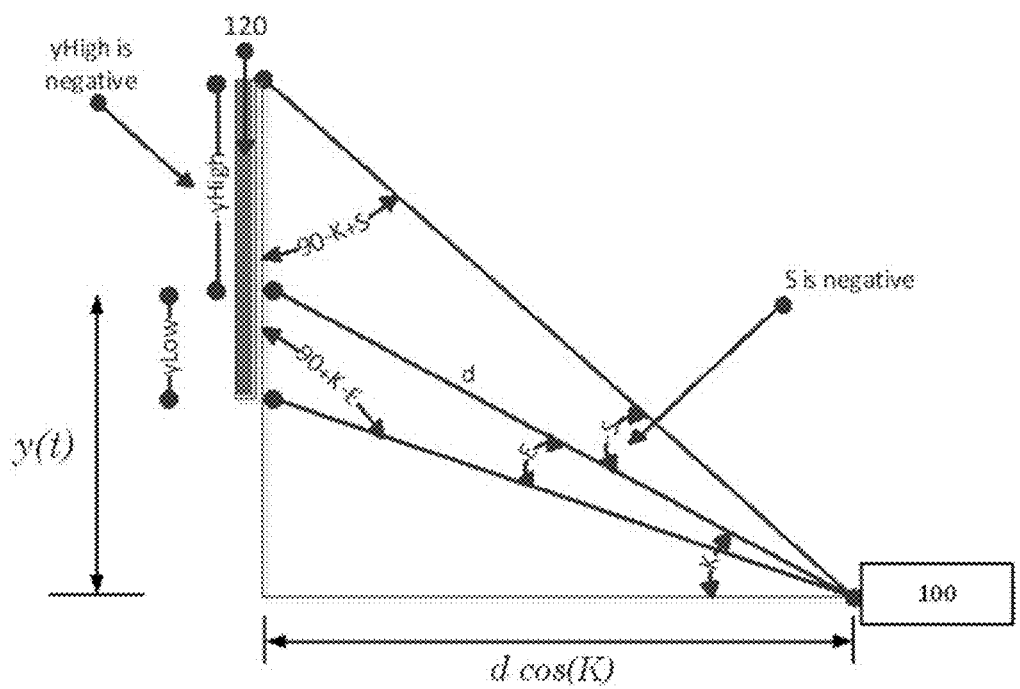
FIG. 4 is a drawing of the relationship between the laser scanning projector of FIG. 2A and the target.

The following description of the calculation of the mechanical angle $\theta_{mechanical}$ is with reference to the keystone angle K being positive. A drawing of the relationship between the laser scanning projector 100 and the target 120 is shown in FIG. 4.

yHigh is the distance on the target 120 between the beam spot of the RGB laser 109 and the upper limit of the display area on the target 120, and similarly, yLow is the distance on the target 120 between the beam spot of the RGB laser 109 and the lower limit of the display area on the target 120. Assuming the distance d between the laser scanning projector 100 to be 1 (the unit type is not relevant), and using the law of sines, yHigh and yLow can be calculated as follows:

$$\frac{-yHigh}{\sin(-S)} = \frac{d}{\sin(90 - K + S)} = > \frac{yHigh}{d} = yH = \frac{\sin(S)}{\sin(90 - K + S)}$$

$$\frac{yLow}{\sin(E)} = \frac{d}{\sin(90 + K - E)} = > \frac{yLow}{d} = yL = \frac{\sin(E)}{\sin(90 + K - E)}$$

The distance Y between the point at which the beam spot would hit the target 120 when at an angle of 0 with normal to the plane of the target and the present beam spot can be calculated as follows:

$$y(t) = d \cdot \sin(K) - \left[yHigh + \frac{t}{T_{trace}} \cdot (yLow - yHigh)\right]$$

$$y(t)/d = \sin(K) - \left[yHigh/d + \frac{t}{T_{trace}} \cdot (yLow/d - yHigh/d)\right]$$

$T_{trace}$ is the total time it takes for the slow axis mirror 114 to move from the start angle S to the end angle E, and t is an instant in time, which runs starts from zero to $T_{trace}$.

When t=0, y(t)=d·sin(K)−yHigh, which is the screen location when θ=−S (since yHigh is negative because S is negative and sin(−s)=−sin(s)).

When t=$T_{trace}$, y(t)=d·sin(K)−yLow.

In order to calculate the angle θ, it should be noted that during the projection the angle is K−θ, so the following calculation can be used:

$$\tan(K - \theta) = \frac{y(t)}{d \cdot \cos(K)}$$

$$\theta(t) = K - \text{arctg}\left(\frac{\sin(K) - \left[yHigh/d + \frac{t}{T_{trace}} \cdot (yLow/d - yHigh/d)\right]}{\cos(K)}\right)$$

Using the trigonometric identity: $\tan^{-1}(x) + \tan^{-1}(y) = \tan^{-1}[(x+y)/(1-xy)]$ $$\theta(t) = \text{arctg}\left(\frac{\sin(K)}{\cos(K)}\right) + \text{arctg}\left(\frac{-\sin(K) + \left[yH + \frac{t}{T_{trace}} \cdot (yL - yH)\right]}{\cos(K)}\right)$$

$$\theta(t) = \operatorname{arctg}\left(\cfrac{\cos(K)}{\cfrac{1}{\left[yH + \cfrac{t}{T_{trace}} \cdot (yL - yH)\right]} - \sin(K)}\right)$$

$$\theta_{mechanical}(t) = 0.5 \cdot \theta = 0.5 \cdot \operatorname{arctg}\left(\cfrac{\cos(K)}{\cfrac{1}{\left[yH + \cfrac{t}{T_{trace}} \cdot (yL - yH)\right]} - \sin(K)}\right)$$

$$\theta_{mechanical}(t) = 0.5 \cdot \theta =$$

$$0.5 \cdot \operatorname{arctg}\left(\cfrac{\cos(K)}{\cfrac{1}{\left[\cfrac{\sin(S)}{\sin(90-K+S)} + \cfrac{t}{T_{trace}} \cdot \left(\cfrac{\sin(E)}{\sin(90+K-E)} - \cfrac{\sin(S)}{\sin(90-K+S)}\right)\right]} - \sin(K)}\right)$$

Once $\theta_{mechanical}$ has been determined, the mirror control circuitry 116 generates a suitable control signal 113 therefor. The control signal 113 is generated by first converting $\theta_{mechanical}$ to a moment applied to the slow axis mirror 114 using a translation table 121. This moment is determined according to a voltage and current translation table, which is derived through a calibration process performed on the slow axis mirror 114 or is derived analytically.

Instantaneous velocity of the slow axis mirror 114 can be determined by calculating the time derivative of the mechanical mirror angle $f_{mechanical}$ as follows:

$$\theta_{mechanical}(t) = \frac{1}{2}K - \frac{1}{2}\operatorname{arctg}\left(\left(\frac{\sin(K)}{\cos(K)} - \frac{yH}{\cos(K)}\right) - \frac{(yL-yH)}{T_{trace} \cdot \cos(K)} \cdot t\right).$$

Therefore, $$v(t) = \frac{d}{dt}\theta(t)$$

Keeping in mind that:

$$f'(g(x)) = f'(g(x))g'(x)$$

and that:

$$\frac{d}{dx}(a\tan(x)) = \frac{1}{1+x^2}$$

The following can be performed:

$$f(x) = a\tan(x)$$

$$g(x) = a - bx$$

$$a = \frac{\sin(K)}{\cos(K)} - \frac{yH}{\cos(K)}$$

$$b = \frac{(yL - yH)}{T_{trace} \cdot \cos(K)}$$

$$f'(g(x)) = f'(g(x))g'(x) = \left(\frac{1}{1+g^2(x)}\right) \cdot (-b)$$

$$v(t) = \frac{d}{dt}\theta(t)$$

$$= -\frac{1}{2} \cdot \cfrac{\cfrac{(yH - yL)}{T_{trace} \cdot \cos(K)}}{1 + \left(\cfrac{\sin(K) - yH}{\cos(K)} - \cfrac{(yL - yH)}{T_{trace} \cdot \cos(K)} \cdot t\right)^2}$$

$$= \cfrac{\cfrac{(yL - yH)}{2T_{trace} \cdot \cos(K)}}{1 + \left(\cfrac{\sin(K) - yH}{\cos(K)} - \cfrac{(yL - yH)}{T_{trace} \cdot \cos(K)} \cdot t\right)^2}$$

It should be noted that the calculations for instantaneous velocity are shown for explanatory purposes only. They could be used in the case where the intensity of the RGB laser 109 is to be varied with respect to mirror speed, however this is not particularly useful given that the techniques herein already provide for a uniform scan pattern with a uniform brightness.

Figure 5:
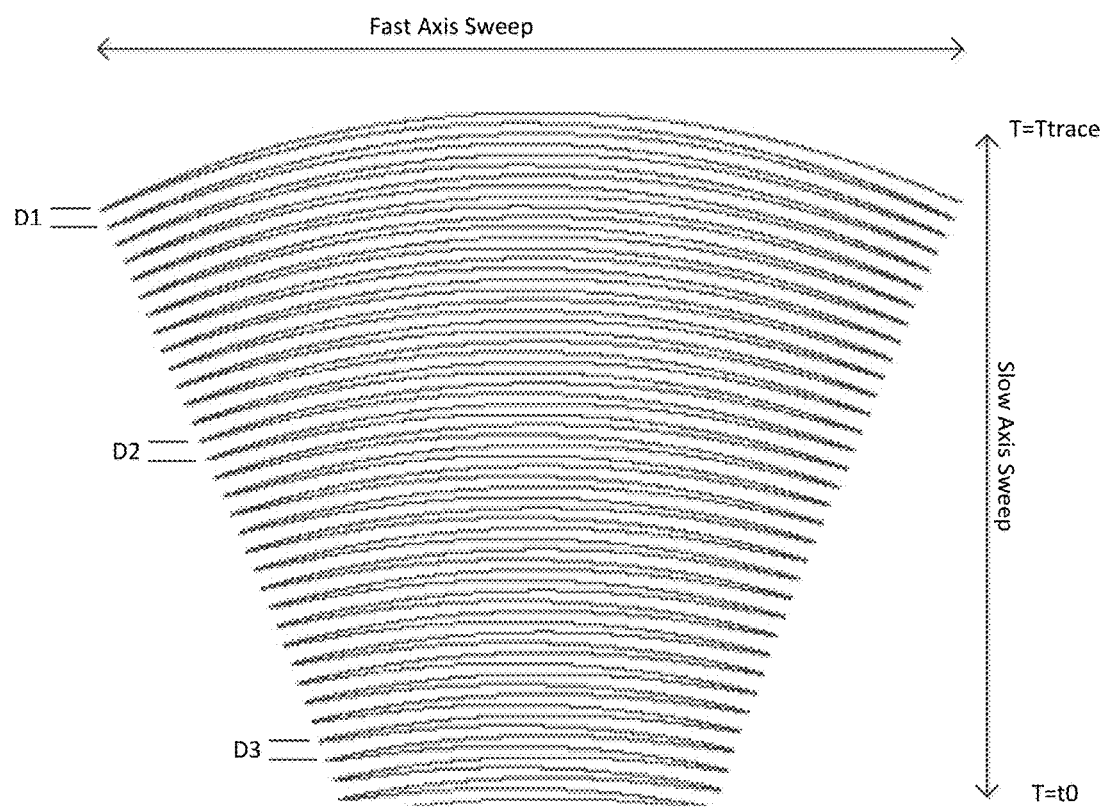
FIG. 5 depicts a uniform scan pattern resulting from control of the slow axis scanning mirror of FIG. 2A according to techniques and methods described herein.

The techniques described above provide for a scan pattern with uniformly spaced horizontal lines, such as shown in FIG. 5. Here, it can be seen that the vertical distance D1 between horizontal lines toward the top of the vertical axis is equal to the distance D2 in the middle as well as the distance D3 toward the bottom.

It should be noted, however, that the scan pattern is trapezoidal in shape since the keystone is not zero, and that the horizontal lines decrease in length from the top to the bottom of the scan pattern. There may also be a pincushion effect in some cases. Optics, such as lenses, may be used to correct this trapezoidal scan pattern to a rectangular scan pattern, or the lasers 102, 104, 106 may be switched on and off at appropriate times such that the pattern actually formed by the beam spot is rectangular and not trapezoidal.

Although the above has been described with respect to the processor or motor control circuitry doing the above calculations in real time during scanning of the mirror, it should be understood that in some cases, these calculations may be performed in advance, with the results stored in a lookup table for each potential keystone angle. The results may then be retrieved and used during operation. In this case, the calculations are still performed by a processor, and still performed as described above.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A device, comprising:
   mirror control circuitry for controlling a first micro-mirror of a micro-mirror apparatus that scans across a target area in a scan pattern, the mirror control circuitry comprising:
      a processor configured to:
         determine a mechanical angle of the first micro-mirror for a given instant in time during scanning of the first micro-mirror between upper and lower rotational limits, the mechanical angle being such to maintain the scan pattern as being uniform while the micro-mirror apparatus scans across the target area between the upper and lower rotational limits, wherein the mechanical angle is determined as a function of a distance along a slow-axis between a position of a spot of a beam reflected by the micro-mirror apparatus onto the target area when the first micro-mirror is at rest and an upper slow-axis limit of the target area, a distance along the slow-axis between the position of the spot of the beam reflected by the micro-mirror apparatus onto the target area when the first micro-mirror is at rest and a lower slow-axis limit of the target area, and an angle between the beam reflected by the micro-mirror apparatus onto the target area when the first micro-mirror is at rest and a vector normal to the target area; and generate a driving signal for the first micro-mirror as a function of the determined mechanical angle for the first micro-mirror at the given instant in time.

2. The device of claim 1, wherein the processor is further configured to determine the mechanical angle as a function of the given instant in time and a total time for the first micro-mirror to sweep from a start angle to an end angle.

3. The device of claim 1, wherein the processor is further configured to determine the mechanical angle as a function of a ratio between the given instant in time and a total time for the first micro-mirror to sweep from a start angle to an end angle.

4. The device of claim 1, wherein the driving signal for the first micro-mirror is such that the first micro-mirror has an angular velocity of the first micro-mirror that varies as the first micro-mirror scans between upper and lower rotational limits.

5. The device of claim 1, wherein the micro-mirror apparatus is configured to scan across the target area along a fast-axis and along a slow-axis.

6. The device of claim 5, wherein the fast-axis is a horizontal axis and wherein the slow-axis is a vertical axis.

7. The device of claim 1, wherein the first micro-mirror is configured to be driven by the driving signal to move quasi-statically.

8. The device of claim 1, wherein the micro-mirror apparatus further comprises a second micro-mirror; wherein the first micro-mirror is a slow-axis micro-mirror; and wherein the second micro-mirror is a fast-axis micro-mirror.

9. A The device of claim 1, comprising:
mirror control circuitry for controlling a first micro-mirror of a micro-mirror apparatus that scans across a target area in a scan pattern, the mirror control circuitry comprising:
a processor configured to:
determine a mechanical angle of the first micro-mirror for a given instant in time during scanning of the first micro-mirror between upper and lower rotational limits, the mechanical angle being such to maintain the scan pattern as being uniform while the micro-mirror apparatus scans across the target area between the upper and lower rotational limits; and
generate a driving signal for the first micro-mirror as a function of the determined mechanical angle for the first micro-mirror at the given instant in time;
wherein the processor determines the mechanical angle as:

$$\theta(t) = 0.5 * \arctg\left(\frac{\cos(K)}{\frac{1}{\left[yHigh/d + \frac{t}{T} \cdot (yLow/d - yHigh/d)\right]} - \sin(K)}\right)$$

where $\theta$ is the mechanical angle, t is the given instant in time, T is a total time for the first micro-mirror to sweep from a start angle to an end angle, yHigh is a distance along a slow-axis between a position of a spot of a beam reflected by the micro-mirror apparatus onto the target area when the first micro-mirror is at rest and an upper slow-axis limit of the target area, yLow is a distance along the slow-axis between the position of the spot of the beam reflected by the micro-mirror apparatus onto the target area when the first micro-mirror is at rest and a lower slow-axis limit of the target area, d is the distance from the target area to the first micro-mirror when the first micro-mirror is at rest and K is an angle between the beam reflected by the micro-mirror apparatus onto the target area when the first micro-mirror is at rest and a vector normal to the target area.

10. The device of claim 9, wherein the micro-mirror apparatus is configured to scan across the target area along a fast-axis and along a slow-axis.

11. The device of claim 10, wherein the fast-axis is a horizontal axis and wherein the slow-axis is a vertical axis.

12. The device of claim 9, wherein the first micro-mirror is configured to be driven by the driving signal to move quasi-statically.

13. The device of claim 9, wherein the micro-mirror apparatus further comprises a second micro-mirror; wherein the first micro-mirror is a slow-axis micro-mirror; and wherein the second micro-mirror is a fast-axis micro-mirror.

14. A method of projecting an image onto a target, comprising:
generating a beam of collimated light; and
scanning the beam of collimated light between first and second opposing display area limits on the target along a fast-axis using a fast-axis mirror while scanning the beam of collimated light between third and fourth opposing display area limits on the target along a slow-axis using a slow-axis mirror;
wherein the scanning of the beam of collimated light between the third and fourth opposing display area limits on the target along the slow-axis is performed by, at a plurality of instants in time:
determining a mechanical angle of the slow-axis mirror for a given instant in time of the plurality thereof, the mechanical angle being such to maintain a scan pattern formed by the scanning of the beam of collimated light between the first and second opposing display area limits on the target and the scanning of the beam of collimated light between the third and fourth opposing display area limits on the target as being uniform, the mechanical angle of the slow-axis mirror being a function of a distance along the slow-axis between a position of a spot of the beam of collimated light on the target when the slow-axis mirror is at rest and the third opposing display area limit, a distance along the slow-axis between the position of the spot of the beam of collimated light on the target when the slow-axis mirror is at rest and the fourth opposing display area limit, and an angle between the beam of collimated light when the slow-axis mirror is at rest and a vector normal to the target; and
generating a driving signal for the slow-axis mirror as a function of the determined mechanical angle for the slow-axis mirror at the given instant in time.

15. The method of claim 14, wherein the mechanical angle is further determined as a function of the given instant in time and a total time for the slow-axis mirror to sweep from a start angle to an end angle.

16. The method of claim 14, wherein the mechanical angle is further determined as a function of a ratio between the given instant in time and a total time for the slow-axis mirror to sweep from a start angle to an end angle.

17. The method of claim 14, wherein the mechanical angle is determined as:

$$\theta(t) = 0.5 * \mathrm{arctg}\left(\cfrac{\cos(K)}{\left[\cfrac{1}{\left[yHigh/d + \cfrac{t}{T} \cdot (yLow/d - yHigh/d)\right]} - \sin(K)\right]}\right)$$

where θ is the mechanical angle, t is the given instant in time, T is a total time for the slow-axis mirror to sweep from a start angle to an end angle, yHigh is a distance along the slow-axis between a position of a spot of the beam of collimated light on the target when the slow-axis mirror is at rest and the third opposing display area limit, yLow is a distance along the slow-axis between the position of the spot of the beam of collimated light on the target when the slow-axis mirror is at rest and the fourth opposing display area limit, d is the distance from the target to the slow-axis mirror when the slow-axis mirror is at rest and K is an angle between the beam of collimated light when the slow-axis mirror is at rest and a vector normal to the target.

18. A device, comprising:
   a laser source configured to emit a laser beam;
   a fast-axis mirror;
   a slow-axis mirror;
   a mirror controller configured to:
      drive the fast-axis mirror so as to scan the laser beam between first and second opposing display area limits on a target along a fast-axis;
      drive the slow-axis mirror so as to scan the laser beam between third and fourth opposing display area limits on the target along a slow-axis;
      at a plurality of instants in time, determine a mechanical angle of the slow-axis mirror for a given instant in time of the plurality thereof as a function of a distance along the slow-axis between a position of a spot of the laser beam on the target when the slow-axis mirror is at rest and the third opposing display area limit, a distance along the slow-axis between the position of the spot of the laser beam on the target when the slow-axis mirror is at rest and the fourth opposing display area limit, an angle between the laser beam when the slow-axis mirror is at rest and a vector normal to the target, and a ratio between the given instant in time and a total time for the slow-axis mirror to sweep from a start angle to an end angle.

19. The device of claim 18, wherein the mechanical angle is determined as:

$$\theta(t) = 0.5 * \mathrm{arctg}\left(\cfrac{\cos(K)}{\left[\cfrac{1}{\left[yHigh/d + \cfrac{t}{T} \cdot (yLow/d - yHigh/d)\right]} - \sin(K)\right]}\right).$$

where θ is the mechanical angle, t is the given instant in time, T is a total time for the slow-axis mirror to sweep from a start angle to an end angle, yHigh is a distance along a slow-axis between a position of a spot of the laser beam reflected onto the target when the slow-axis mirror is at rest and an upper slow-axis limit of the target, yLow is a distance along the slow-axis between position of the spot of the laser beam reflected onto the target when the slow-axis mirror is at rest and a lower slow-axis limit of the target, d is a distance from the target to the slow-axis mirror when the slow-axis mirror is at rest, and K is an angle between the laser beam reflected onto the target when the slow-axis mirror is at rest and a vector normal to the target.

20. The device of claim 18, wherein the fast-axis mirror is a resonating mirror.

21. The device of claim 18, wherein the slow-axis mirror is a quasi-static mirror.

22. The device of claim 18, wherein the driving of the fast-axis mirror and the slow-axis mirror by the mirror controller produces a homogenous scan pattern having a constant display resolution.

23. A device, comprising:
   a processor configured to generate values of a mechanical angle for a slow-axis micro-mirror that scans across a target area in a scan pattern and to store the values in a lookup table, the processor to generate the values by:
      determining the mechanical angle of the slow-axis micro-mirror for a given instant in time during scanning of the slow-axis micro-mirror between upper and lower rotational limits, and storing the mechanical angle in the lookup table, the mechanical angle being such to maintain the scan pattern as being uniform while the slow-axis micro-mirror scans across the target area between the upper and lower rotational limits, the mechanical angle being a function of a distance along a slow-axis between a position of a spot of a beam reflected onto the target area when the slow-axis micro-mirror is at rest and an upper slow-axis limit of the target area, a distance along the slow-axis between position of the spot of the beam reflected onto the target area when the slow-axis micro-mirror is at rest and a lower slow-axis limit of the target area, and an angle between the beam reflected onto the target area when the slow-axis micro-mirror is at rest and a vector normal to the target area.

24. The device of claim 23, wherein the processor further determines the mechanical angle as a function of the given instant in time and a total time for the slow-axis micro-mirror to sweep from a start angle to an end angle.

25. The device of claim 23, wherein the processor further determines the mechanical angle as a function of a ratio between the given instant in time and a total time for the slow-axis micro-mirror to sweep from a start angle to an end angle.

26. A device, comprising:
   a processor configured to generate values of a mechanical angle for a slow-axis micro-mirror that scans across a target area in a scan pattern and to store the values in a lookup table, the processor to generate the values by:
      determining the mechanical angle of the slow-axis micro-mirror for a given instant in time during scanning of the slow-axis micro-mirror between upper and lower rotational limits, and storing the mechanical angle in the lookup table, the mechanical angle being such to maintain the scan pattern as being uniform while the slow-axis micro-mirror scans across the target area between the upper and lower rotational limits, wherein the processor determines the mechanical angle as:

$$\theta(t) = 0.5 * \text{arctg}\left(\frac{\cos(K)}{\dfrac{1}{\left[yHigh/d + \dfrac{t}{T} \cdot (yLow/d - yHigh/d)\right]} - \sin(K)}\right)$$

where θ is the mechanical angle, t is the given instant in time, T is a total time for the slow-axis micro-mirror to sweep from a start angle to an end angle, yHigh is a distance along a slow-axis between a position of a spot of a beam reflected onto the target area when the slow-axis micro-mirror is at rest and an upper slow-axis limit of the target area, yLow is a distance along the slow-axis between position of the spot of the beam reflected onto the target area when the slow-axis micro-mirror is at rest and a lower slow-axis limit of the target area, d is the distance from the target area to the slow-axis micro-mirror when the slow-axis micro-mirror is at rest, and K is an angle between the beam reflected onto the target area when the slow-axis micro-mirror is at rest and a vector normal to the target area.

27. The device of claim 26, wherein the slow-axis is a vertical axis.

* * * * *